(12) United States Patent
Charych

(10) Patent No.: US 8,917,172 B2
(45) Date of Patent: Dec. 23, 2014

(54) WIRELESS PET BARRIER USING RFID

(71) Applicant: EPC4ROI Limited Partnership, Poquott, NY (US)

(72) Inventor: Harold Charych, Poquott, NY (US)

(*) Notice: Subject to any disclaimer, the term of this patent is extended or adjusted under 35 U.S.C. 154(b) by 26 days.

(21) Appl. No.: 13/758,184

(22) Filed: Feb. 4, 2013

(65) Prior Publication Data
US 2013/0207803 A1 Aug. 15, 2013

Related U.S. Application Data

(60) Provisional application No. 61/633,629, filed on Feb. 15, 2012.

(51) Int. Cl.
G08B 1/08 (2006.01)
A01K 15/02 (2006.01)

(52) U.S. Cl.
CPC .................. *A01K 15/023* (2013.01)
USPC .................. 340/539.11; 340/572.8; 340/10.1

(58) Field of Classification Search
CPC ... A01K 15/00; A01K 15/023; A01K 1/0236; A01K 1/0245; A01K 1/035
USPC .......... 340/539.11, 568.1, 572.1, 572.7, 10.1, 340/572.8, 573.1, 539.1, 531
See application file for complete search history.

(56) References Cited

U.S. PATENT DOCUMENTS

| | | | | |
|---|---|---|---|---|
| 5,872,516 | A * | 2/1999 | Bonge, Jr. | 340/573.3 |
| 7,583,931 | B2 * | 9/2009 | Eu | 455/41.2 |
| 8,049,630 | B2 * | 11/2011 | Chao Cheng et al. | 340/573.3 |
| 2008/0168949 | A1 * | 7/2008 | Belcher et al. | 119/721 |
| 2009/0207001 | A1 * | 8/2009 | Masin et al. | 340/10.41 |
| 2010/0126071 | A1 * | 5/2010 | Hill | 49/70 |
| 2013/0222141 | A1 * | 8/2013 | Rhee et al. | 340/573.3 |

* cited by examiner

Primary Examiner — Daniel Previl

(57) ABSTRACT

A method of using radio frequency identification (RFID), in particular ultra high frequency (UHF) RFID, is described, which keeps pets from accessing forbidden areas. The pet wears a device which is preferably powered by the animal's own activity, converted to electrical power by a motion harvesting system to recharge a battery. The device uses an RFID reader to detect and identify RFID tags placed at boundaries of areas to which the pet is forbidden to enter, and sets off an alarm to warn the pet if it is approaching such an area. Because the RFID tags are individually identifiable, the forbidden area alarm can be configured to the pet, allowing use in a multiple-pet household.

33 Claims, 4 Drawing Sheets

WIRELESS PET BARRIER USING RFID

REFERENCE TO RELATED APPLICATIONS

This application claims one or more inventions which were disclosed in Provisional Application No. 61/633,629, filed Feb. 15, 2012, entitled "RFID Wireless Pet Barrier". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of animal training. More particularly, the invention pertains to training animals to remain in or avoid a selected area using wireless alarm devices.

2. Description of Related Art

Over 30 million homes in the United States have house pets such as cats, dogs, rabbits or ferrets which are permitted access to some or all of the house. Worldwide, that number is in the hundreds of millions. A typical problem with having a house pet live in your home is that there are certain areas of the home the owner does not want the animal to enter. The area may be a danger to the pet or the pet may not be fully trained and can soil an expensive rug or couch. A further reason may be that the pet can inadvertently damage a display or piece of furniture.

The simplest way to keep a pet out of an area of the house is to close a door or put up physical barricade that will restrain the pet from entering or leaving a certain area. In a conventional house layout with physically divided rooms, this approach could solve some portion of the problem. However, in a house with an "open landscape" interior architecture, where one room flows into another with few dividing walls, this approach does not work well.

There are devices on the market that use a motion sensor to detect the presence of the pet and then sound an ultrasonic alarm. This makes the pet uncomfortable and could make it leave the area. A drawback to this approach is the pet needs to come into the vicinity of the device to be detected. Also, differentiating human motion from animal motion is difficult and the ultrasonic alarm can be on for an extended amount of time, so that the pet becomes accustomed to the sound, making the pet think that the sound is part of its environment rather than a warning. This prevents any learning about acceptable areas and unacceptable areas where the pet can venture.

Another device on the market to solve this problem is to have the pet wear a transmitter that gets detected by a stationary receiver. Whenever the transmitter gets in the vicinity of the receiver, indicating the pet is approaching a forbidden area, an ultrasonic noise is emitted or the pet gets electric shocks through its collar in differing implementation. A problem with these approaches is that the ultrasonic noise must be loud enough to prevent the pet from entering and the receiver is always a distance away from the pet. Using the shock treatment can be considered cruel to the pet, but if the shock is not strong enough to be a deterrent than it could be totally ineffectual. Another problem is that the transmitter in the pet's collar must be transmitting at all times and requires power from rechargeable or expendable batteries. If the batteries are not changed or recharged often, the device will not reinforce the pet's behavior and could become useless. A further problem with all of these devices is that there is no differentiation between pets in a multi-pet household. As an example, an older pet may be allowed in certain areas, but a puppy should be excluded, or the cat is allowed in rooms forbidden to the rabbit and vice-versa.

The Invisible Fence® system made by Invisible Fence, Inc., of Knoxville, Tenn., effectively is the reverse of this last system—the area within which a pet is to be confined is surrounded by a wire which continuously transmits a signal, and the pet (usually a dog) wears a receiver which picks up the signal from the wire. The pet is warned, as described above, when the receiver detects that it has approached the wire too closely. This system has the same drawbacks of the systems which have the pet carrying a transmitter, as well as requiring the entire area to be surrounded by the "fence" wire. In the typical outdoor installation, the wire can be buried, but it could be problematic to conceal the wire within a home.

SUMMARY OF THE INVENTION

A method of using radio frequency identification (RFID), in particular ultra high frequency (UHF) RFID, is described, which keeps pets from accessing forbidden areas. The pet wears a device which is preferably powered by the animal's own activity, converted to electrical power by a motion harvesting system to recharge a battery. The device uses an RFID reader to detect and identify RFID tags placed at boundaries of areas to which the pet is forbidden to enter, and warns the pet through an alarm if it is approaching such an area. Because the RFID tags are individually identifiable, the forbidden area alarm can be configured to the pet, allowing use in a multiple-pet household.

DETAILED DESCRIPTION OF THE INVENTION

Figure 1:
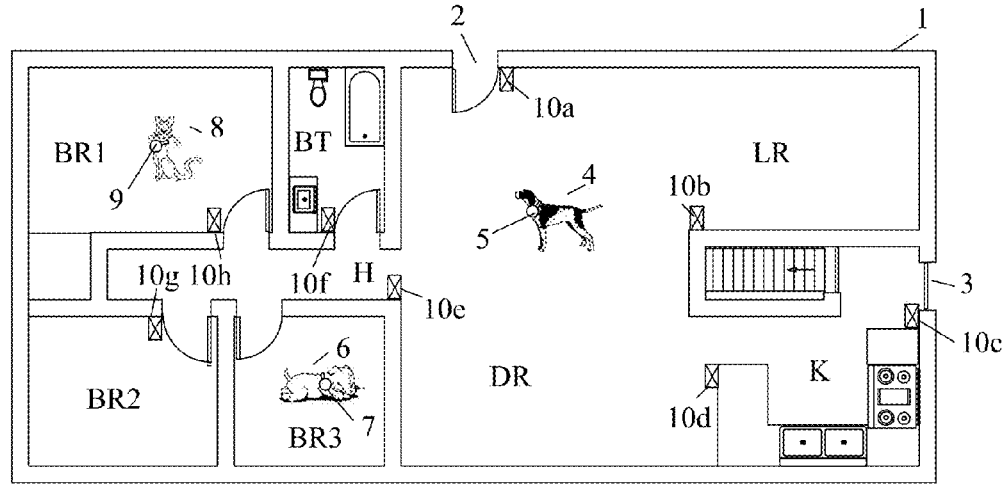
FIG. 1 shows a block diagram of the wireless pet barrier system as it might be installed in a home.

FIG. 1 shows how a Pet Barrier system would be deployed in a representative house 1. While the system is described herein as it would be used in a house, it will be understood that the system can be used both indoors or outdoors. The house has three bedrooms BR1-BR3 along a hall H, a bathroom BT, dining room DR, kitchen K and living room LR. There is a front door 2 opening into the living room LR and a back door 3 leading into the kitchen K. The family in this example has three pets: an adult dog 4, a puppy 6, and a cat 8.

Figure 3:
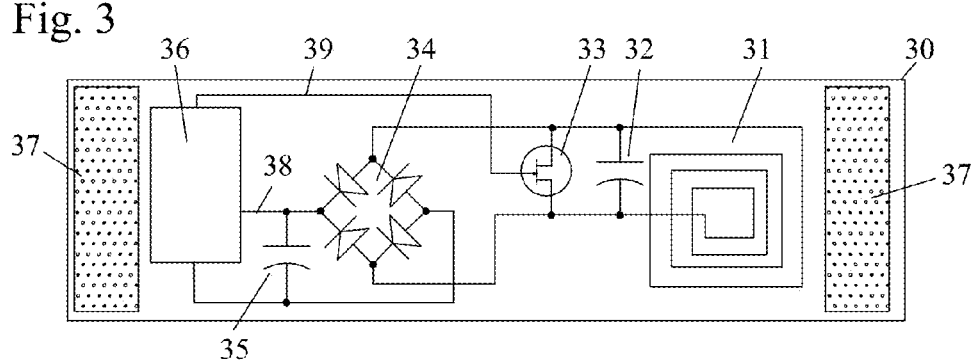
FIG. 3 shows a passive RFID tag suitable for use with the wireless pet barrier system.

FIG. 3 shows an example of a block or schematic diagram of an RFID tag which could be used with the system. It will be understood that the specific design shown is for example purposes only, to explain how passive RFID tags work, and other designs are usable within the teachings of the invention. Passive RFID tags are commercially available from numerous sources, for example, Alien Technologies in Morgan Hills, Calif., or Avery-Dennison in Flowery Branch, Ga.

The RFID tag has a base 30, usually made of several layers of thick paper, stiff cardboard or thin plastic, within which the components are embedded or encapsulated. An antenna 31 and capacitor 32 form a resonant circuit which can be excited by a radio frequency (RF) signal of appropriate frequency and strength. While any of the commonly used frequency bands can be used within the teachings of the invention, operation with RF signals in the UHF band are preferred (865-868 MHz in Europe, 902-928 MHz in the US).

The antenna 31-capacitor 32 circuit is coupled to a rectifier circuit, here shown as a full-wave bridge 34, so that when an RF signal of appropriate frequency is received by the antenna 31, it is rectified to direct current (DC) by the bridge 34 and charges a capacitor 35. This provides DC power 38 to an RFID controller integrated circuit (IC) 36.

The controller IC 36 is internally programmed with an identification number, so that when the IC 36 is powered up by the rectified RF signal, it outputs a digital signal 39 which is encoded with at least the identification number. This signal keys a transistor 33 to transmit the identification number back to the interrogating transmitter by transmitting the signal as an RF signal through antenna 31. Thus, the signal from a given RFID tag can be identified by its unique identification number or code.

The tag body 30 may be provided with adhesive areas 37 which allow the tag to be easily attached to a wall wherever it is desired. The adhesive area 37 is preferably one of the removable non-marring kind which is used for hanging posters or the like. Alternatively, the tag body 30 could be provided with a hole to allow the tag to hang on a hook, or even with a larger hole to allow the tag to be structured as a doorknob hanger.

It will be understood that it is preferred that each tag be encoded with a "unique identification number" so that each individual tag can be uniquely identified by an RFID reader, and that a preferred embodiment will be used in the explanation of the system below. However, as the term "unique" is used in this explanation, this is not meant to imply that the tags need to be globally uniquely identifiable. The identification number actually only needs to identify the tag in such a way as to permit the operation of the system, and it is possible to use identification numbers which are assigned according to a rank or class or type and repeated through the system so that, for example, all bedroom tags have one number, all living/dining room tags another, tags placed near doors or stairs have yet another, and so on.

Figure 7:
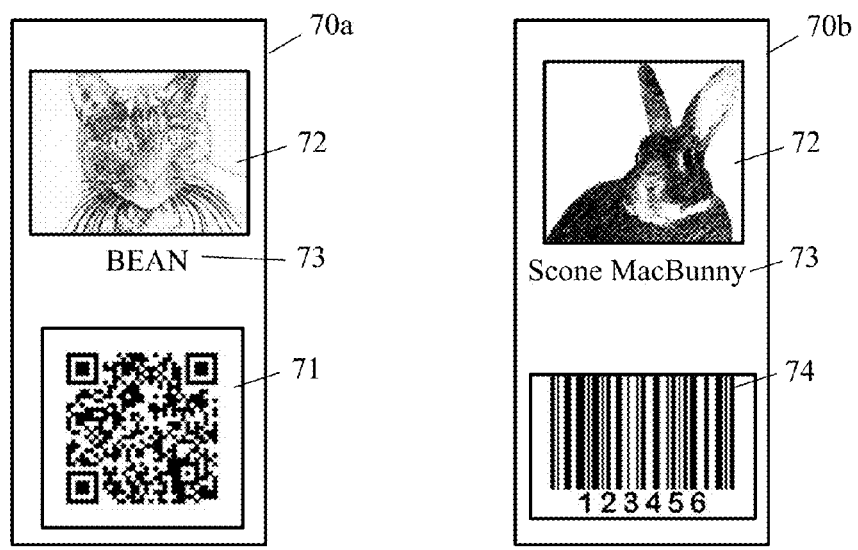
FIG. 7 shows two examples of an embodiment of the RFID tag.

Another arrangement, shown in FIG. 7, would be for the RFID tags, such as these example tags 70a and 70b, to be imprinted with a machine-readable code such as QR code 71 or bar code 74 containing the identification number of the tag 70a or 70b. The user would read the bar coded tag ID, for example with a smart phone or tablet camera, using a popular bar code reading application such QR Droid for Android phones. Once all of the tags for a particular pet are read, the smart phone would be connected to that pet's animal-borne device controller via a USB wired connection or Wi-Fi wireless connection and the forbidden tag identification numbers would be downloaded into the animal-borne device. This would be a simple and low cost way to get the tag identifications into each pet's device.

Using this arrangement, it would be possible to have systems of RFID tags that relates to each pet, as shown in FIG. 7. Tags may be purchased with the pet's name 73 and possibly a picture of the pet 72. These would be the tags that would mark an area where this particular pet cannot go. So, in the example of FIG. 7, tag 70a would be posted in an area which is forbidden to Bean the cat, while tag 70b would be posted in an area which is forbidden to Scone MacBunny the rabbit.

Other arrangements are possible within the teachings of the invention.

A plurality of passive RFID tags 10a-10h are located around the house, at least one in each area from which an animal is to be excluded or to which an animal is to be restricted. It will be understood that, depending on the area(s) to be covered and the range of the tags, a single tag might cover more than one room, or several tags might be needed within a single room. If there is a specific item or smaller area to be covered, a tag might be allocated to that—for example, a tag can be inserted into the cushions of a couch or chair to keep a pet off the furniture.

Figure 2:
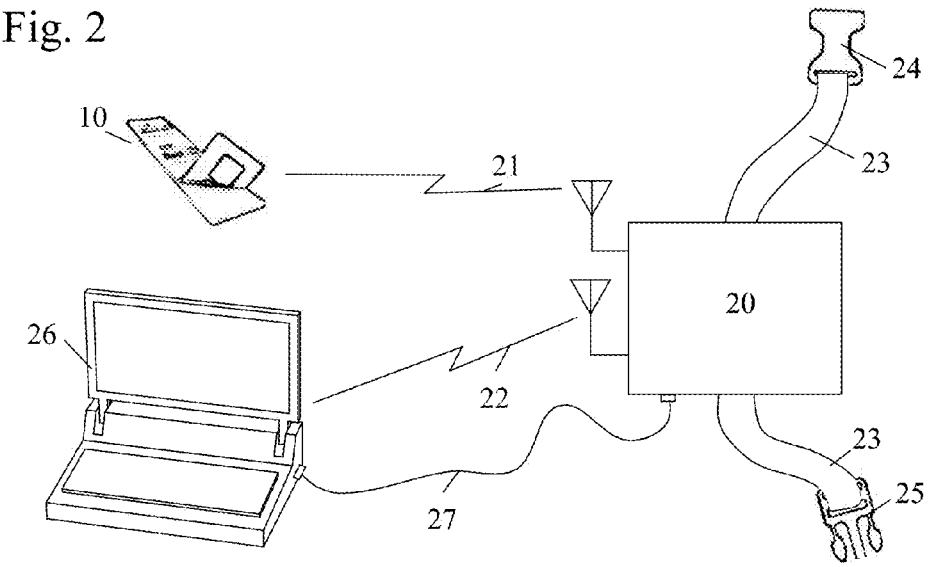
FIG. 2 shows a block diagram of the components of a wireless pet barrier system using the animal-borne device.

Each of the animals is provided with an animal-borne device 20-device 5 is worn by adult dog 4, device 7 by puppy 6 and device 9 by cat 8. An example of an animal-borne device is shown in block form in FIG. 2. The animal-borne device 20 is provided with a strap or harness 23 which can securely attach the device 20 to an animal. It will be understood that while FIG. 2 shows this harness as neck collar comprising a simple strap 23 on the ends of which are provided a male buckle 25 and mating female buckle 24 of conventional design, the invention is not limited to any particular design of attachment. Many kinds of collars and harnesses are known to the art, the applicability of which depend upon the particular kind of animal to which the device 20 is to be attached. For example, while neck collars such as the one shown in FIG. 2 are commonly used for dogs, especially larger dogs, it is not uncommon to use "H" type harnesses with cats or rabbits. Such harnesses which have one strap around the animal's neck and another around its body behind the front legs. Other harnesses, such as those which resemble zip-up jackets and which are commonly used with rabbits and small dogs, are also useful within the teachings of the invention. Alternatively, the animal-borne device can be implemented to be used with a pre-existing collar or harness, for example as a hanging pendant, or the animal-borne device can be embedded within a harness or collar.

The animal-borne device 20 provides a bi-directional link 21 to interrogate RFID tags 10. The animal-borne device 20 can communicate with a computer 26 through a wireless link 22 or wired link 27, so that the user can program the animal-borne device 20 as indicated below. The computer 26 can be a laptop computer as shown in the figure, or a desktop machine or tablet or smart phone, or any other device which would permit such communication. The wireless link 22 can be the common 802.11 WiFi system, BlueTooth Low Energy (BTLE), ZigBee, or any other wireless protocol which may at some point become preferred. The alternative wired link 27 can be USB, FireWire, Lightning, RS-232 serial, parallel, or any other type as desired.

Figure 4:
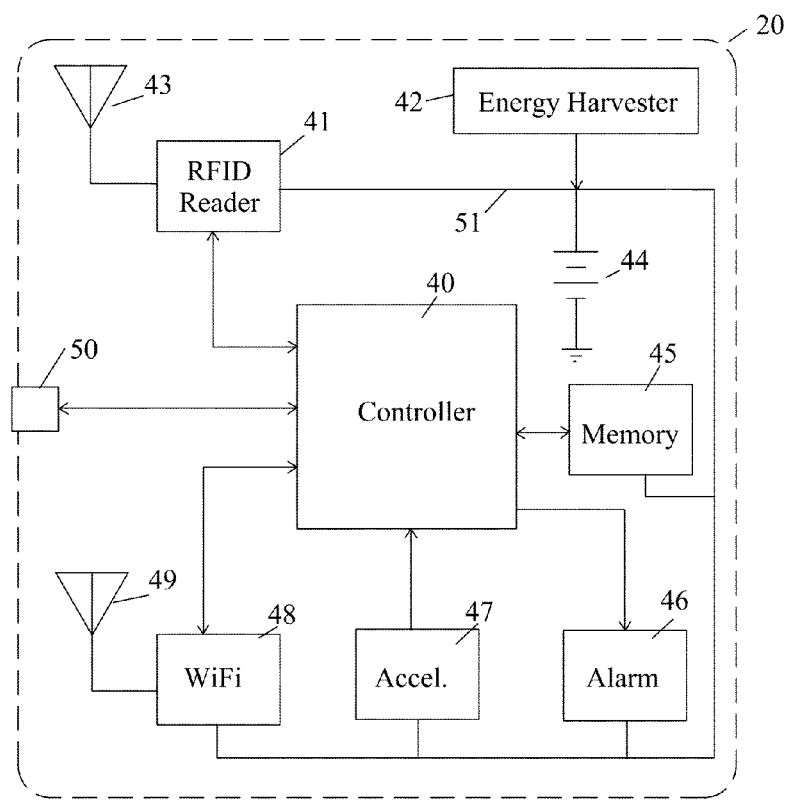
FIG. 4 shows a block diagram of the animal-borne device for use with the wireless pet barrier system.

FIG. 4 shows a more detailed block diagram of the animal-borne device 20. The components which make up the animal-borne device 20 comprise a controller circuit 40 with memory 45, an RFID interrogator/reader 41 with its antenna 43, a communications link such as a wireless link circuit 48 with its antenna 49 or a wired connector 50 or both, an accelerometer or other motion detector 47, an energy harvester 42, a rechargeable battery 44 and an alarm 46. Other components might be added within the teachings of the invention.

Controller circuit 40 is preferably a low-power "computer on a chip" in a single package, such as an ARM micro control unit made by Nuvotron. The controller 40 may include internal programmable read-only memory (PROM) to contain the basic programming. Additional nonvolatile memory 45, which is preferably "flash" memory, is provided to store user information, for example the RFID identification information, as explained below. This memory 45 can be external to the controller 40 or it could be internal RAM or EPROM if such is provided in the processor chip. The controller 40 has at least one input coupled to the accelerometer 47, at least one output coupled to the alarm 46, and bidirectional input-output communications ports coupled to the RFID reader 41 and the wired connection 50 and/or wireless link 48.

The animal-borne device 20 is preferably powered by rechargeable battery 44, which can be any kind of rechargeable battery such as lithium-ion (LiOn), nickel-cadmium (NiCd), alkaline or other technologies as may become available. The battery 44 is preferably charged by a vibration energy harvester 42 that uses the motion of the pet as it walks or runs to generate electrical power. The energy harvester 42 can be of the same kind as used in "shake to charge" flashlights which operate by a moving magnet passing near a coil, or can be a compact device made by Precision Motors.

It will be understood, however, that within the teachings of the invention the animal-borne device 20 can alternatively be powered by expendable batteries, and if a rechargeable battery is used it could be recharged by a conventional battery charger instead of, or in addition to, the energy harvester 42.

The RFID reader 41 generates an RF signal at a frequency appropriate to the RFID tags being used, and listens for replies from such RFID tags. As the pet approaches a restricted area, the RFID reader 41 will detect the presence of the RFID tag. When a reply is detected, the RFID reader 41 provides the identification number of the tag to the controller 40. The RFID reader can be, for example, a fully integrated UHF reader chip made by Impinj in Seattle, Wash. The RFID reader 41 is preferably operated at a relatively low power level so that tag detection would happen at a relatively close range, preferably about 1 to 2 feet, although longer-range detection could be accomplished by using a higher power on the interrogation signal.

The RFID reader 41 preferably uses a dipole antenna 43 embedded in the harness or collar 23 that the pet wears, so long as the harness or collar is made of a non-electrically conductive material such as leather or plastic or webbing. The antenna 43 will preferably be made of flexible metal that retains its shape, such as beryllium copper or stainless steel.

Figure 5:
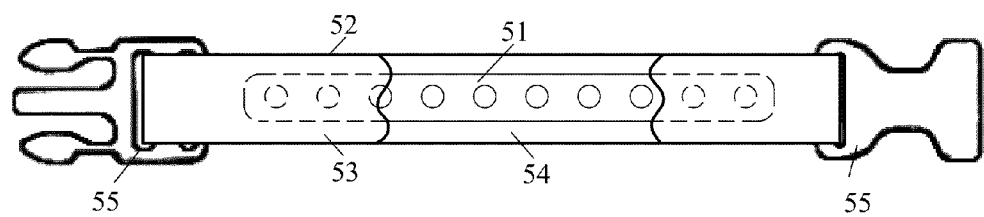
FIG. 5 shows an RFID antenna embedded in a collar for use with the animal-borne device.
Figure 8:
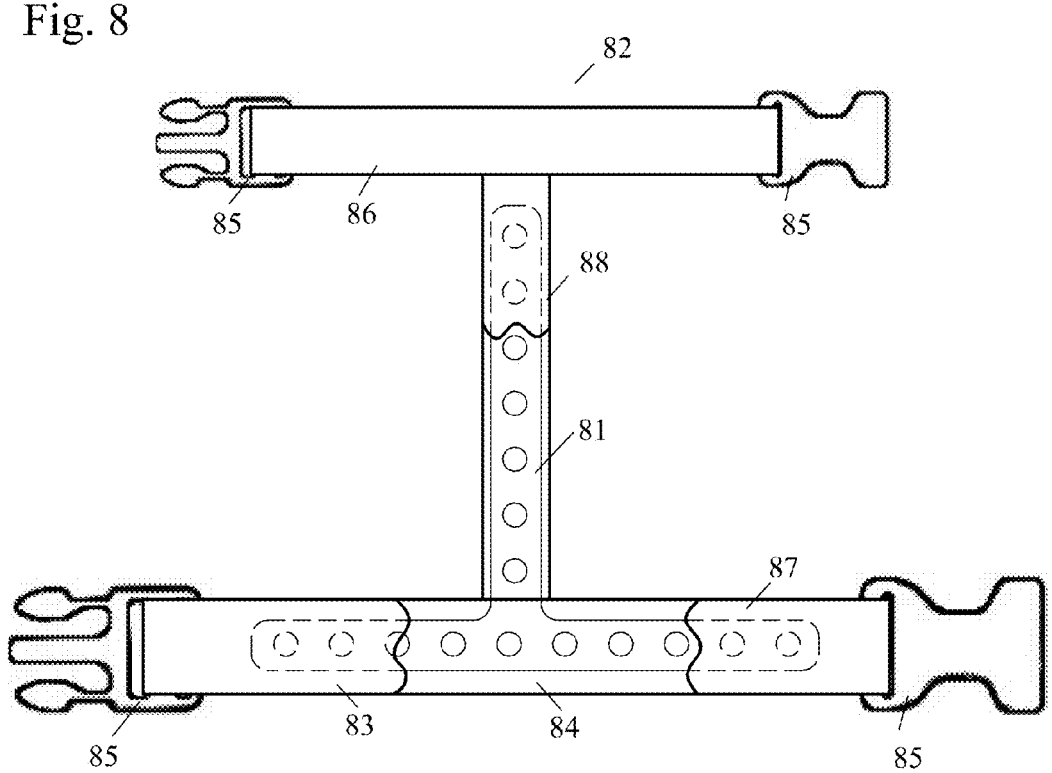
FIG. 8 shows an RFID antenna embedded in a harness for use with the animal-borne device.

The antenna design is shown in detail in FIG. 5, which shows an antenna 51 embedded in collar 52, which would be attached around the pet's neck by buckles 55. The collar 52 is made up of two layers of leather or webbing 53 and 54, with the central portion of upper layer 53 being cut away to show the antenna 51 and the lower layer 54. Similarly, FIG. 8 shows an antenna 81 of another design attached to an "H" type harness 82, which has a central strap 88 which would run along the pet's back or belly, fastened to the pet by straps 86 and 87 which attach around the pet's neck and chest, respectively, by buckles 85. In FIG. 8 the upper layer 83 of the harness 82 on straps 88 and 87 is cut back to show antenna 81 and lower layer 84.

The antennas 51 or 81 are coupled by a thin coaxial cable to the RFID reader in the animal-borne device. The cable can be embedded in the collar 52 or harness 82.

As discussed in connection with FIG. 4, above, the controller 40 can communicate with a user through a wired connector 50 or a wireless link through antenna 49 which is implemented through wireless controller circuit 48. The wireless controller 48 can be a standard WiFi chip such as those made by Marvell or Realtek. If desired, the wired connector 50 can be configured to take power from the connecting device, for example a standard USB port, to charge the battery 44. This would be desirable for the initial use of the system before the energy harvester 42 has time to charge the battery 44, or if the animal-borne device 20 has not been used for a while and the battery 44 has discharged.

An accelerometer 47 is provided to detect acceleration and de-acceleration indicating that the pet is motion, as well as detecting orientation changes. Preferably, accelerometer 47 is a microelectromechanical system (MEMS) solid-state sensor, such as those made by Analog Devices which are used in devices such as Apple iPods® or smartphones to detect motion or orientation of the device. Using the data from the accelerometer 47, the controller 40 can detect that the pet is standing and in motion, and can then turn on the RFID reader 41 to look for signals coming back from RFID tags. Similarly, when the data from the accelerometer 47 indicates that the pet is asleep or resting, lying down or otherwise motionless, the controller 40 can turn off the RFID reader 41, thus conserving battery power.

During the times when the pet is active and walking around, the RFID reader 41 can be programmed to be on for, say, 50 ms and off for, say, 200 ms, knowing that the pet cannot travel very far in 200 ms. This will further conserve battery power and limit the amount of RF emissions generated by the device. When a forbidden tag is detected these times can be adjusted so the reader is on for a longer time period.

The alarm 46 is preferably an ultrasonic transducer, such as that made by Ceramic Transducer Design Company. The ultrasonic alarm 46 around the pet's neck, when activated by the controller 40, will create an uncomfortable sound heard only by the pet, that will cause the pet to back away from the restricted area until the sound is no longer heard. It will be understood that other forms of alarm are possible, including the electrical shock system as used in prior art dog-training collars, in which an alarm activation would result in giving the pet a mild shock.

Figure 6:
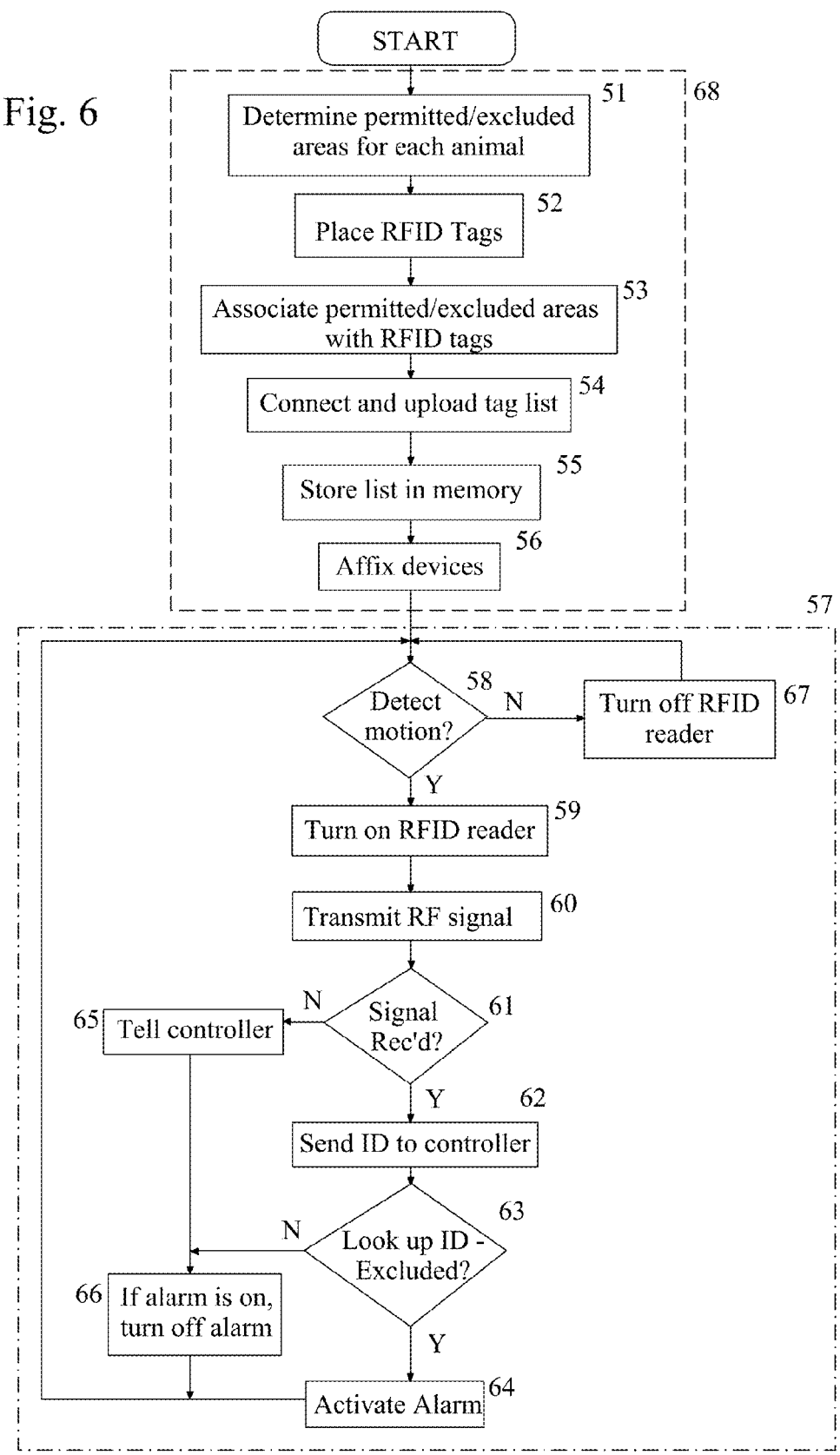
FIG. 6 shows a flowchart of the method of operation of the animal-borne device of the wireless pet barrier system.

The operation of the system, with reference to the example of FIG. 1 and the block diagrams of FIGS. 2-4, is as follows, with the number before each paragraph referring to the step numbers in the flowchart of FIG. 6:

68. Preparation Phase: The system is set up for use with the animal or animals whose access to the area(s) around the house is to be controlled.

51. In preparation for implementing the system, the areas to which each animal is to be permitted, or from which it is to be excluded are determined. The family in the example is willing to allow the adult dog Snoopy 4 in the living room LR, dining room DR and kitchen K, but does not want him in the hall H leading to bedrooms BR1-BR3. The cat Fluffy 8 is allowed more or less free run, except she is not permitted in the kitchen K or the second bedroom BR2 which is used as a computer room. The puppy Rex 6 is to be restricted to the third bedroom BR3 and hall H, since he is not yet house-trained. Neither of the dogs 4 and 6 are allowed in the bathroom BT, or to leave either door 2 or 3. The cat 8 has a litter box in the bathroom BT and cat flaps in doors 2 and 3, so she is permitted access to these areas denied to the dogs 4 and 6.

52. RFID tags are placed around the house 1, at least in the areas to which access is desired to be controlled. In the example shown in FIG. 1, tag 10a is at the front door 2, tag 10b is in the living room LR, tag 10c is at the back door 3, tag 10d is at the entrance to the kitchen K from dining room DR, tag 10e is where hall H enters dining room DR, tag 10f is in the bathroom, and tags 10g and 10h are in bedrooms BR2 and BR1, respectively. For the purposes of this example, assume that the identification number of each tag is the same as its number in the FIG. 10*a*-10*h*), although it will be understood that in practice an actual identification number of some sort would be supplied and marked on each tag. The identification number of each tag is noted by the user.

It should be noted that the previous two steps can be executed in either order, although it is preferred to first determine the areas to be controlled, since that can aid in deciding as to where to place the tags. Alternatively, tags can simply be placed at each room or area entrance or exterior doorway.

53. The permitted/excluded areas for each animal are associated with the RFID tags posted in each area, which would result in something like the following table:

TABLE 1 programming chart

| Animal | Device No. | Permitted tags | Excluded tags |
|---|---|---|---|
| Snoopy (dog 4) | 5 | 10b, 10d | 10a, 10c, 10e, 10f, 10g, 10h |
| Fluffy (cat 8) | 9 | 10a, 10b, 10c, 10e, 10f, 10h | 10d, 10g |
| Rex (puppy 6) | 7 | none | 10a, 10b, 10c, 10d, 10e, 10f, 10g, 10h |

Alternatively, the user could tabulate the information by checking boxes or entering codes for each tag indicating if it marks an "excluded" area:

TABLE 2 alternate programming chart

| Animal | Dev. No. | 10a | 10b | 10c | 10d | 10e | 10f | 10g | 10h | ... | 10n |
|---|---|---|---|---|---|---|---|---|---|---|---|
| Snoopy | 5 | X | | X | | X | X | X | X | | |
| Fluffy | 9 | | | | X | | | X | | | |
| Rex | 7 | X | X | X | X | X | X | X | X | | |

In the alternative embodiment which uses machine-readable coded RFID tags, as shown in FIG. 7 and discussed above, instead of having to manually enter a table of permitted/excluded areas, the step 53 of associating the tags with the animal would be done simply by scanning the code on each tag with a camera connected to the computer, for example by a camera built-in to a laptop, smartphone or tablet.

54. Using an application program loaded on their computer 26, the user programs the animal-borne devices 5, 7 and 9, in turn, by connecting the computer 26 to each of the animal-borne devices 5, 7 and 9, via a wireless link 22 or wire 27. The application program on the computer 26 uploads at least one of the lists of permitted tags or excluded tags to the controller 40 through the link 22 or 27—if desired, both the list of permitted tags and excluded tags could be uploaded.

55. The controller 40 in each device stores the list(s) in memory 45. It will be understood that the animal-borne device 20 could be programmed to respond with an alarm either to reception of a tag which is on the excluded list or, conversely, a tag which is not on the permitted list, or even to both situations, which would determine which list (or both) would need to be uploaded and stored.

If there is more than one animal-borne device to be programmed, steps 54 and 55 are repeated for each device.

56. The animal-borne devices 5, 7 and 9, are then affixed to the pets 4, 6 and 8, respectively.

57. Operation Phase: The system now begins to operate as a pet barrier. The following explanation will take Snoopy (dog 4) as the example, assuming that at this point he is in the living room LR as shown in FIG. 1, and explains the operation of his animal-borne device 5.

58. As Snoopy begins to move around, the accelerometer 47 detects the motion, communicating this to controller 40.

59. Controller 40 turns on the RFID reader 41.

60. RFID reader 41 sends out an RF signal through antenna 43 to interrogate any RFID tag within range.

Snoopy 4 walks toward the entrance to hall H. At some point the RFID reader 41 is close enough to activate tag 10*e*, which responds with its identification number.

61. Tag 10*e*'s signal is in turn detected by the RFID reader 41 and . . . .

62. . . . it is communicated to controller 40.

63. The controller 40 looks up the identification number in the memory 45, and finds it is on the "excluded" list.

64. Controller 40 activates the alarm 46, which makes an ultrasonic sound which startles Snoopy 4. He backs off from the tag 10*e*.

65. When the tag 10*e* is out of range, the RFID reader 41 stops receiving the identification, and communicates the cessation to controller 40 (or, alternatively, it stops sending the identification number to controller 40, which is programmed to recognize this stop as meaning that the tag is no longer being received).

66. The controller 40 turns off alarm 46, to Snoopy's relief, and the method repeats from step 58, checking for continued motion.

Snoopy now wanders over toward the kitchen K. At some point the RFID reader 41 is close enough to activate tag 10*d*, which responds with its identification number.

61. Tag 10*d*'s identification number is detected by the RFID reader 41 and . . . .

62. . . . communicated to controller 40.

63. Controller 40 looks up the identification number in the memory 45, and finds it is on the "permitted" list, if there is one. Alternatively, if there is no "permitted" list, the controller 40 will find that 10*d* is not on the "excluded" list. In either case, this means that Snoopy is not in a "no go" area, and the alarm 46 is not turned on (or turned off, if it is on).

As Snoopy wanders around his permitted territory, his activity causes the energy harvester 42 to generate electricity, keeping the battery 44 charged, and the method repeats, with the controller 40 setting off the alarm 46 as he approaches tags 10*a*, 10*c* or 10*e*, and doing nothing as he passes tags 10*b* or 10*d*.

Finally, tired of his wandering, Snoopy lies down to take a nap.

58. The accelerometer 47 detects the cessation of motion, as well as perhaps a change in orientation, and communicates this to controller 40.

67. Controller 40 accordingly turns off the RFID reader 41, and the method repeats from step 58.

58. Controller 40 continues to monitor accelerometer 47 for data which once again detects motion. When the accelerometer 47 detects that Snoopy has started to move again, the controller 40 once again turns on the RFID reader 41, and the method progresses to step 59, etc.

It is possible within the teachings of the invention that the controller 40 can be programmed to recognize different kinds of motion, for example walking as opposed to rolling over in sleep, and to turn on the RFID reader 41 only for the kind of motion which indicates walking around. This would save battery life by preventing drain by the RFID reader 41 if the animal is just sleeping restlessly. Alternatively, the controller 40 could be programmed to turn on the RFID reader 41 on any detection of motion by the accelerometer, but turn off the RFID reader 41 if no further motion is detected after a determined period of time. During the times when the pet is active and walking around, the controller could also be programmed to turn RFID reader on and off in a cycle of, for example, 50 ms on and 200 ms off, knowing that the pet cannot travel very far in 200 ms. This will further conserve battery power and limit the amount of RF emissions generated by the device. When a forbidden tag is detected these cycle times can be adjusted so the reader is on continuously or for a longer time period.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An animal-borne device for controlling access by an animal into an area, comprising:
   a) a controller comprising a processor and memory, the memory storing a list comprising at least one stored identification identifying at least one RFID tag placed in an area from which the animal is to be excluded;
   b) an RFID reader coupled to a bidirectional port of the controller;
   c) an alarm coupled to an output of the controller; and
   d) program instructions stored in the memory of the controller, executable by the processor to execute the steps of:
      i) receiving a communication of an identification of an RFID tag from the RFID reader when the RFID reader reads an RFID tag having an identification;
      ii) looking up the identification communicated from the RFID reader in the plurality of stored identifications in the memory; and
      iii) if the identification communicated from the RFID reader is on the list stored in the memory of the controller, the controller activating the alarm.

2. The animal-borne device of claim 1, further comprising a battery for supplying electrical power at least to the controller, the RFID reader, the alarm, and the accelerometer.

3. The animal-borne device of claim 2, in which the battery is rechargeable, and the animal-borne device further comprises an energy harvester coupled to the rechargeable battery, such that energy due to motion of the animal-borne device is harvested to recharge the rechargeable battery.

4. The animal-borne device of claim 1, in which the alarm is an ultrasonic alarm.

5. The animal-borne device of claim 1, in which the alarm is a shock device.

6. The animal-borne device of claim 1, further comprising a communications link for loading identifications of RFID tags into the list stored in the memory, coupled to a bidirectional port of the controller.

7. The animal-borne device of claim 6, in which the communications link is a wireless link.

8. The animal-borne device of claim 1, in which the animal-borne device further comprises a collar or harness for attaching the animal-borne device to an animal, and the RFID reader is coupled to a flexible antenna embedded in the collar or harness.

9. The animal-borne device of claim 8, in which the flexible antenna is made of beryllium copper or stainless steel.

10. The animal-borne device of claim 1, in which the animal-borne device further comprises an accelerometer coupled to an input of the controller; and the program instructions further comprise instructions to the controller to activate the RFID reader is when the accelerometer detects that the animal-borne device is moving.

11. A wireless pet barrier system using RFID, comprising:
   i) at least one animal-borne device comprising:
      a) a controller comprising a processor and memory, the memory storing a list comprising at least one stored identification identifying at least one RFID tag placed in an area from which the animal is to be excluded;
      b) an RFID reader coupled to a bidirectional port of the controller; and
      c) an alarm coupled to an output of the controller; and
   ii) a plurality of RFID tags, each RFID tag being encoded with an identification number; and
   iii) program instructions stored in the memory of the controller of the animal borne device, executable by the processor to execute the steps of:
      A) receiving a communication of an identification of an RFID tag from the RFID reader when the RFID reader reads an RFID tag having an identification;
      B) looking up the identification communicated from the RFID reader in the plurality of stored identifications in the memory; and
      C) if the identification communicated from the RFID reader is on the list stored in the memory of the controller, the controller activating the alarm.

12. The pet barrier system of claim 11, in which the at least one animal-borne device further comprises a battery for supplying electrical power at least to the controller, the RFID reader, the alarm, and the accelerometer.

13. The pet barrier system of claim 12, in which the battery is rechargeable, and the at least one animal-borne device further comprises an energy harvester coupled to the rechargeable battery, such that energy due to motion of the pet barrier system is harvested to recharge the rechargeable battery.

14. The pet barrier system of claim 11, in which the alarm is an ultrasonic alarm.

15. The pet barrier system of claim 11, in which the alarm is a shock device.

16. The pet barrier system of claim 11, in which the animal-borne device further comprises a communications link for loading identifications of RFID tags into the list stored in the memory, coupled to a bidirectional port of the controller.

17. The pet barrier system of claim 11, in which the communications link is a wireless link.

18. The pet barrier system of claim 11, in which the at least one animal-borne device further comprises a collar or harness for attaching the animal-borne device to an animal, and the RFID reader is coupled to a flexible antenna embedded in the collar or harness.

19. The pet barrier system of claim 18, in which the flexible antenna is made of beryllium copper or stainless steel.

20. The pet barrier system of claim 11, in which the animal-borne device further comprises an accelerometer coupled to an input of the controller; and the program instructions further comprise instructions to the controller in the animal-borne device to activate the RFID reader when the accelerometer detects that the animal-borne device is moving.

21. The pet barrier system of claim 11, in which the RFID tags are passive.

22. The pet barrier system of claim 21, in which the RFID tags use RF signals in the UHF frequency range.

23. The pet barrier system of claim 11, in which the plurality of RFID tags further comprise a machine-readable code encoding the identification number.

24. The pet barrier system of claim 23, in which the machine-readable code encoding the identification number is a QR code.

25. The pet barrier system of claim 23, in which the machine-readable code encoding the identification number is a bar code.

26. A method of using a wireless pet barrier system using RFID to control pet access to at least one excluded area, the wireless pet barrier system comprising a plurality of RFID tags, at least one of the RFID tags being located adjacent to an excluded area, each RFID tag being encoded with an identification number; and an animal-borne device comprising a controller comprising a processor and memory, an RFID reader coupled to a bidirectional port of the controller, and an alarm coupled to an output of the controller; the method comprising the steps of:
   a) the RFID reader in the animal-borne device transmitting an RF signal to interrogate an RFID tag in range of the RF signal;
   b) the RFID tag in range of the RF signal responding with the identification number with which the RFID tag has been encoded;
   c) the RFID reader in the animal-borne device communicating the identification number received from the RFID tag to the controller;
   d) the controller looking up the identification number communicated by the RFID reader in a list of identification numbers stored in the memory; and
   e) if the identification number communicated by the RFID reader is on the list of identification numbers stored in memory as an excluded area identification number, the controller turning on the alarm.

27. The method of claim 26, in which the method further comprises the step, after step (e), of the controller turning off the alarm if the identification number communicated by the RFID reader is not on the list of identification numbers stored in memory as an excluded area identification number.

28. The method of claim 26, in which the method further comprises the step of the controller turning off the alarm if the RFID reader stops receiving a signal from an RFID tag.

29. The method of claim 26, in which the animal-borne device further comprises an accelerometer coupled to an input of the controller, the method further comprising the controller activating the RFID reader only when the accelerometer detects that the animal-borne device is moving.

30. The method of claim 26 in which the animal-borne device further comprises a communications link for loading identifications of RFID tags into the memory, coupled to a bidirectional port of the controller, and the method comprises the preliminary steps of:
   the controller accepting a plurality of identification numbers over the communications link; and
   the controller storing the plurality of numbers in memory as a list of excluded area identification numbers.

31. The method of claim 30, in which the RFID tags have a machine-readable code encoding the identification number, and the method further comprises the steps of:
   a computer reading and storing the machine readable codes from a plurality of RFID tags representing excluded areas; and
   the computer transmitting the plurality of identification numbers read from the RFID tags to the controller over the communications link.

32. The method of claim 26, further comprising the step, when the accelerometer detects that the animal is moving, of the controller turning the RFID reader on and off in a cycle of on and off periods, such that the RFID reader transmits during the on periods and does not transmit during the off periods.

33. The method of claim 32, in which when the RFID reader is receiving an RFID tag, the periods of the cycle in which the controller turns the RFID reader on are lengthened such that the RFID reader transmits during a longer part of the cycle than when the RFID reader is not receiving an RFID tag.

* * * * *